United States Patent

Takeuchi

Patent Number: 5,444,497
Date of Patent: Aug. 22, 1995

[54] APPARATUS AND METHOD OF TRANSFERRING VIDEO DATA OF A MOVING PICTURE

[75] Inventor: Kesatoshi Takeuchi, Tokyo-to, Japan

[73] Assignee: Seiko Epson Corporation, Tokyo-to, Japan

[21] Appl. No.: 80,501

[22] Filed: Jun. 24, 1993

[30] Foreign Application Priority Data

Jun. 24, 1992 [JP] Japan .................. 4-166031
Mar. 25, 1993 [JP] Japan .................. 5-066833
Jun. 14, 1993 [JP] Japan .................. 5-168744

[51] Int. Cl.$^6$ ........................... G06F 13/28
[52] U.S. Cl. ................. 348/719; 364/242.31; 395/166; 395/492
[58] Field of Search ........... 395/425; 364/242.3, 364/242.31; G06F 13/28; 348/714, 718, 719

[56] References Cited

FOREIGN PATENT DOCUMENTS 63-34658 (A) 2/1988 Japan .
63-89984 4/1988 Japan .................. G06F 13/28
4160458 6/1992 Japan .................. G06F 13/28

Primary Examiner—James J. Groody
Assistant Examiner—Cheryl Cohen
Attorney, Agent, or Firm—Oblon, Spivak, McClelland, Maier & Neustadt

[57] ABSTRACT

A multiplier 7 multiplies an adding address stored in an adding address memory 3 by a vertical count output from a vertical counter unit 4. A first adder 8 adds the product of the multiplier 7 to an offset address stored in the offset address memory 2. A second adder 9 adds the sum in the first adder 8 to a horizontal count in a horizontal counter unit 5. A third adder 10 adds the sum in the second adder 9 to each of area-start addresses for RGB color components stored in three area-start address memory units 6R, 6G, and 6B, respectively. An output AD3 from the third adder 10 becomes an access address in DMA transfer. The access address in DMA transfer is accordingly calculated by simple arithmetic operation in a DMA controller 34, which thereby attains high-speed DMA transfer.

16 Claims, 14 Drawing Sheets

31R : R PLANE
31G : G PLANE
31B : B PLANE
INIr : R AREA-START ADDRESS
INIg : G AREA-START ADDRESS
INIb : B AREA-START ADDRESS

BP = BPC : CMP = 「H」
BP ≠ BPC : CMP = 「L」

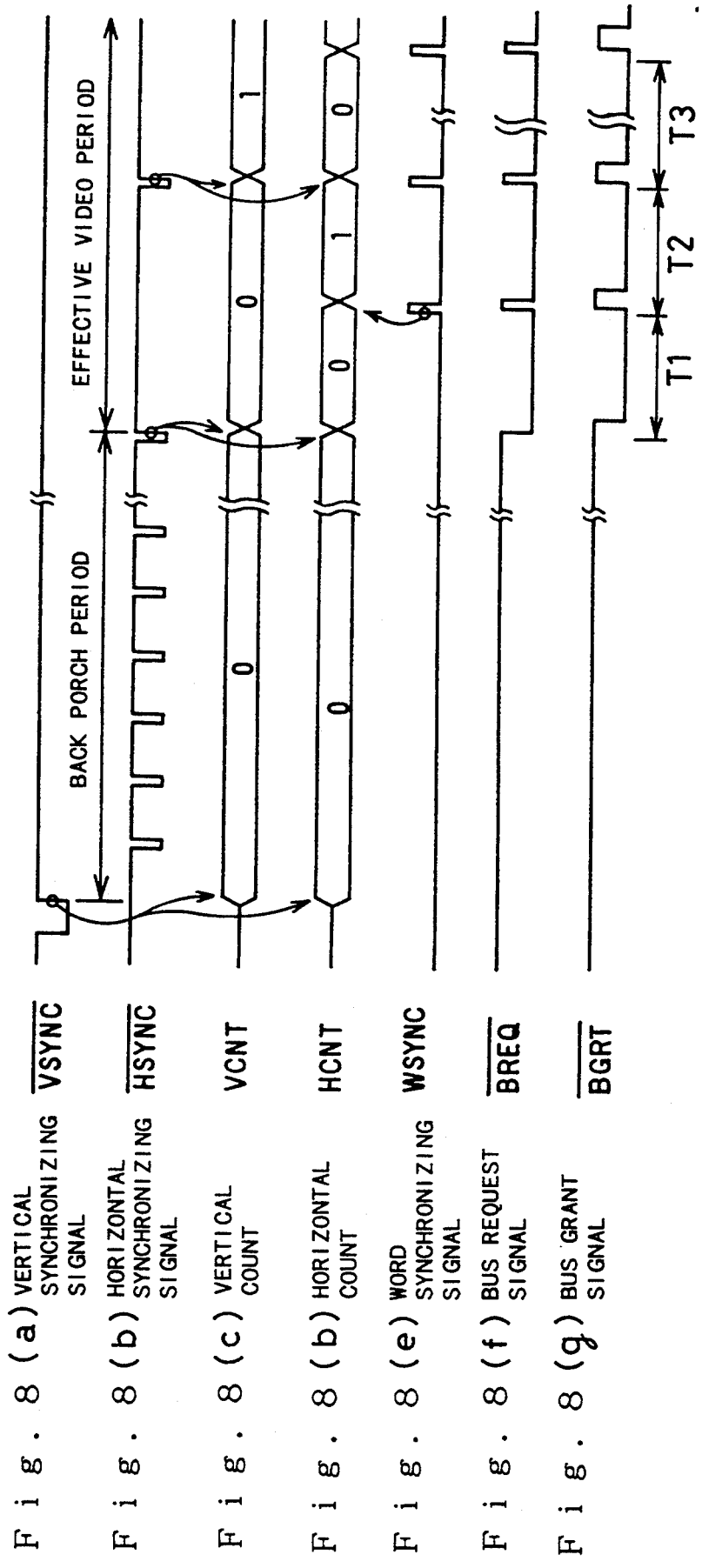

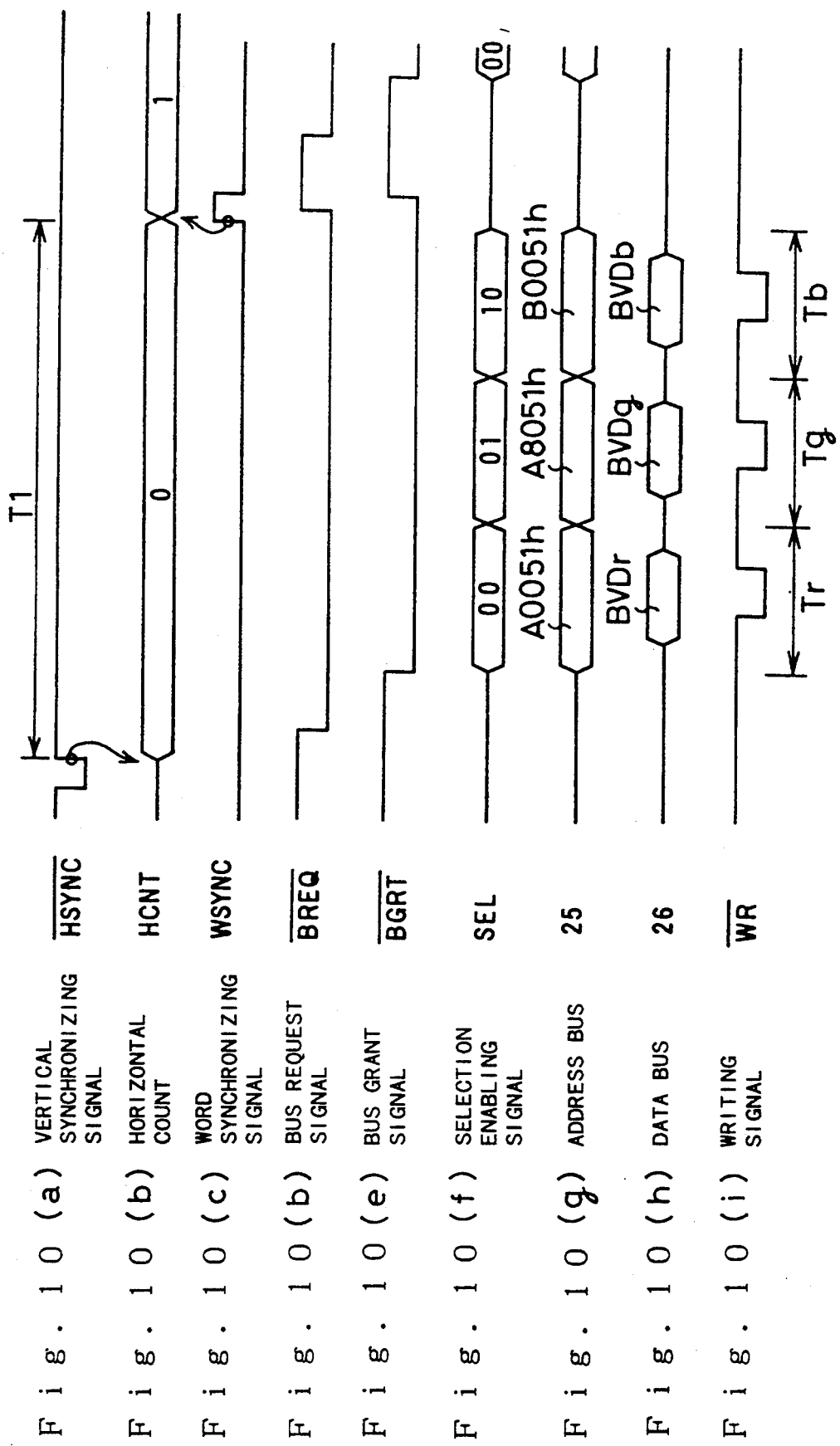

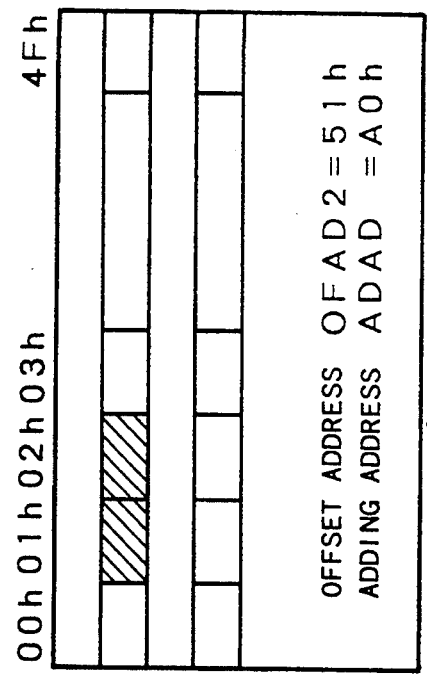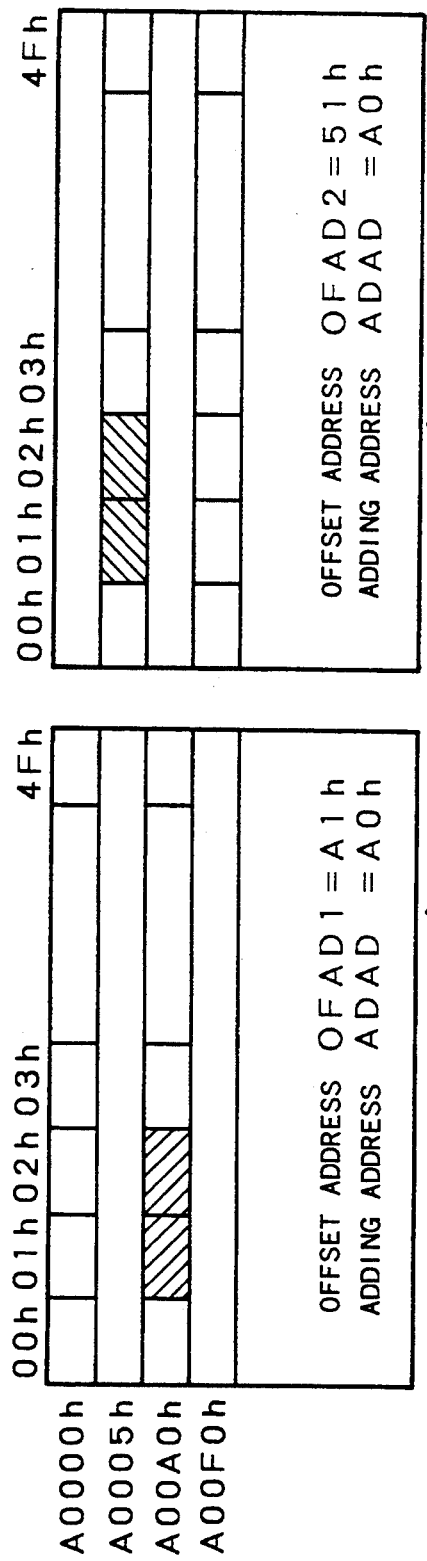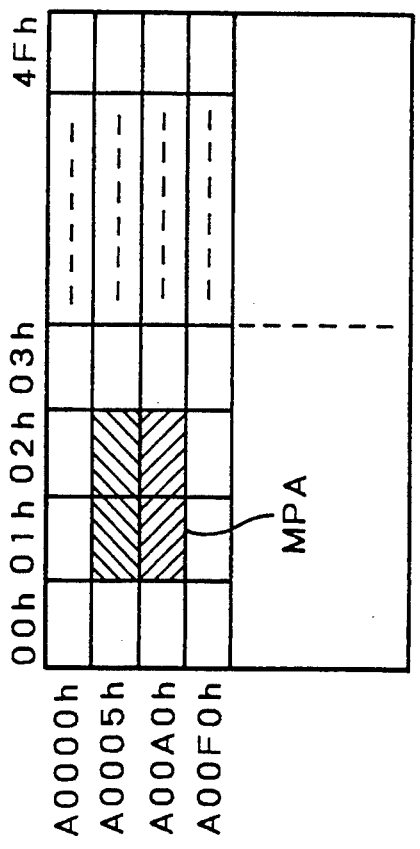
Fig. 11(A), Fig. 11(B), Fig. 11(C) ONE FRAME

APPARATUS AND METHOD OF TRANSFERRING VIDEO DATA OF A MOVING PICTURE

BACKGROUND OF THE INVENTION

1. Field of the Invention

The present invention relates to an apparatus and a method of transferring video data of a moving picture to a video memory.

2. Description of the Related Art

The so-called DMA (Direct Memory Access) transfer can be used in transferring video data supplied from an external device to a video memory in a personal computer.

FIG. 16 is a block diagram showing a conventional computer system having a DMA controller for transferring video data to a video RAM. Three video memories 51R, 51G, and 51B store color data Dr, Dg, and Db for red (R), green (G), and blue (B), respectively. These color data Dr, Dg, and Db are previously binarized, for example, by the Dither Method. DMA controller 55 obtains the right of use of an address bus 53, a data bus 52, and a control bus 54 from a CPU 59, and executes real-time transfer of the binary color data Dr, Dg, and Db stored in the three video memories 51R, 51G, and 51B to video RAMs 56R, 56G, and 56B for display. The binary color data Dr, Dg, and Db thus transferred are further sent to a monitor control unit 57 from the VRAMs 56R, 56G, and 56B to display a video image on a monitor 58.

In DMA transfer, the CPU 59 sends a display start address for the VRAM 56R for the R component to the DMA controller 55 to activate the DMA controller 55. The DMA controller 55 obtains the right of use of the buses from the CPU 59; transfers the binary color data Dr of the R component on a first line to the VRAM 56R for the R component; and returns the right of use of the buses to the CPU 59. The CPU 59 then sends a display start address for the VRAM 56G for the G component to the DMA controller 55 to activate the DMA controller 55, which transfers binary color data Dg in the same manner as for the R component. The B component is also transferred in the same manner. In transferring video data on a second line, the CPU 59 calculates and sends respective display start addresses on the second line for the VRAMs 56R, 56G, and 56B to the DMA controller 55 for successively transferring the binary color data Dr, Dg, and Db of the color components R, G, and B, respectively.

The CPU 59 calculates respective display start addresses on each line for the VRAMs 56R, 56G, and 56B and sends the addresses to the DMA controller 55 in the above manner, and the DMA controller 55 executes DMA transfer of the color data Dr, Dg, and Db on each line accordingly, whereby one field of color data is transferred to the VRAM 56. 'One field' corresponds to an image covered by one through scanning from the left upper corner to the right lower corner on the screen. In many cases, the two to one interlace (or interlace scanning) is performed where two fields compose an image of one frame (or one screen). In this case, the binary color data is transferred by the DMA transfer at a rate of approximately 60 fields per second to display a moving picture on the monitor 58.

One scanning period of one horizontal line is equal to 63 microsecond for NTSC (National Television System Committee) video signals. In the conventional system shown in FIG. 16, only several fields of data can be transferred in each second because the time is consumed by the CPU 59 in calculating and sending the display start addresses to the DMA controller 55, and also consumed by the DMA controller 55 in obtaining the right of use of the buses from the CPU 59 and in the DMA transfer of the binary color data Dr, Dg, and Db on each line. Especially the CPU 59 requires a relatively long time for calculation of the display start addresses and for output of the addresses to the DMA controller 55. As described above, the conventional system transfers only several fields of data per second, and cannot display a smooth moving picture accordingly.

SUMMARY OF THE INVENTION

An object of the present invention is to execute a high-speed transfer of video data to a VRAM to thereby display a smooth moving picture.

The present invention is directed to an apparatus, for use in a computer system comprising a processor for performing logical operation and a video memory controlled by the processor for storing video data, for transferring moving-picture video data representing a moving picture to a desirable memory area in the video memory, comprising: a first memory for storing an offset address indicating a start position of the desirable memory area in the video memory; a second memory for storing an adding address indicating a difference between addresses of two scanning lines adjacent to each other in the video memory; first operation means for calculating a vertical address as a function of vertical and horizontal synchronizing signals synchronous with the moving-picture video data, the vertical address being equal to a value of the adding address multiplied by a scanning line number indicating an ordinal number of a scanning line in the moving picture, the scanning line number being specified by the number of pulses of the horizontal synchronizing signal given to the first operation means; a horizontal counter for generating a horizontal address indicating a difference of an address between an initial position of each scanning line in the moving picture and each pixel on the each scanning line; second operation means for adding the vertical address, the horizontal address, and the offset address to obtain a transfer address indicating an address in the video memory corresponding to a position of the each pixel on the each scanning line in the moving picture, and outputting the transfer address onto an address bus connected to the video memory; and data output means for outputting the moving-picture video data to be transferred to the video memory according to the transfer address, onto a data bus connected with the video memory. Since the transfer address is calculated by arithmetic operation in the first and second operation means, the transfer address can be computed at a high speed.

In a preferred embodiment, the first operation means comprises: scanning line number generating means for generating the scanning line number on the basis of the number of pulses of the horizontal synchronizing signal; and a multiplier for multiplying the adding address and the scanning line number to obtain the vertical address. Thus the vertical address can be readily calculated with one multiplier.

In another preferred embodiment, the first operation means comprises: an adder for summing the adding address by the number of times equal to the number of pulses of the horizontal synchronizing signal given, to thereby obtain the vertical address. Since the vertical address can be calculated with one adder, the circuit structure can be more simplified, and the vertical address can be obtained at a higher speed.

In still another preferred embodiment, the second operation means comprises: a third memory for storing first through third start addresses respectively indicating start positions of first through third memory areas in the video memory for storing video data of respective three primary colors; and adding means for adding the offset address, the vertical address, and the horizontal address to each of the first through third start addresses, to thereby obtain first through third transfer addresses for the three primary colors, respectively. Thus video data representing a color moving picture can be DMA-transferred.

Preferably, the adding means comprises: a first adder for adding the offset address to the vertical address to thereby obtain a first address; a second adder for adding the horizontal address to the first address to thereby obtain a second address; and a third adder for adding the second address to each of the first through third start addresses to thereby obtain the first through third transfer addresses. Since the first through third transfer addresses can be calculated with the three adders, the circuit structure can be simplified, and the transfer addressed can be calculated at a high speed.

The apparatus for transferring moving-picture video data preferably further comprises: bus control means for obtaining right of use of the address bus and the data bus from the CPU and returning the right of use to the CPU. Thus the video data can be transferred at a high speed by so-called DMA transfer.

The data output means preferably comprises means for converting the moving-picture video data supplied in the form of serial data into parallel data. This negates the necessity of a memory having a large volume for storing video data to be transferred.

The present invention is also directed to a computer system comprising: a processor for performing logical operation; a video memory controlled by the processor for storing video data; display means for displaying a video image as a function of the video data stored in the video memory; and the above apparatus for transferring moving-picture video data. In this computer system, an video image can be displayed on the display means as a function of the video data transferred by the apparatus for transferring moving-picture video data.

The present invention is further directed to a method, for use in a computer system comprising a processor for performing logical operation and a video memory controlled by the processor for storing video data, for transferring moving-picture video data representing a moving picture to a desirable memory area in the video memory, comprising the steps of: (a) storing an offset address in a first memory, the offset address indicating a start position of the desirable memory area in the video memory; (b) storing an adding address in a second memory, the adding address indicating a difference between addresses of two scanning lines adjacent to each other in the video memory; (c) calculating a vertical address as a function of vertical and horizontal synchronizing signals synchronous with the moving-picture video data, the vertical address being equal to a value of the adding address multiplied by a scanning line number indicating an ordinal number of a scanning line in the moving picture, the scanning line number being specified by the number of pulses of the horizontal synchronizing signal given; (d) generating a horizontal address indicating a difference of an address between an initial position of each scanning line in the moving picture and each pixel on the each scanning line; (e) adding the vertical address, the horizontal address, and the offset address to obtain a transfer address indicating an address in the video memory corresponding to a position of the each pixel on the each scanning line in the moving picture, and outputting the transfer address onto an address bus connected to the video memory; and (f) outputting the moving-picture video data to be transferred to the video memory according to the transfer address, onto a data bus connected with the video memory.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 8(a) through 8(g) are timing charts showing general operation of the DMA controller 34;

FIGS. 10(a) through 10(i) are timing charts showing transfer of binary video data in the term T1 of FIG. 8;

FIGS. 11(A) through 11(C) show memory spaces for an odd line field and an even line field in interlace scanning;

DESCRIPTION OF THE PREFERRED EMBODIMENT

A. System structure

Figure 1:
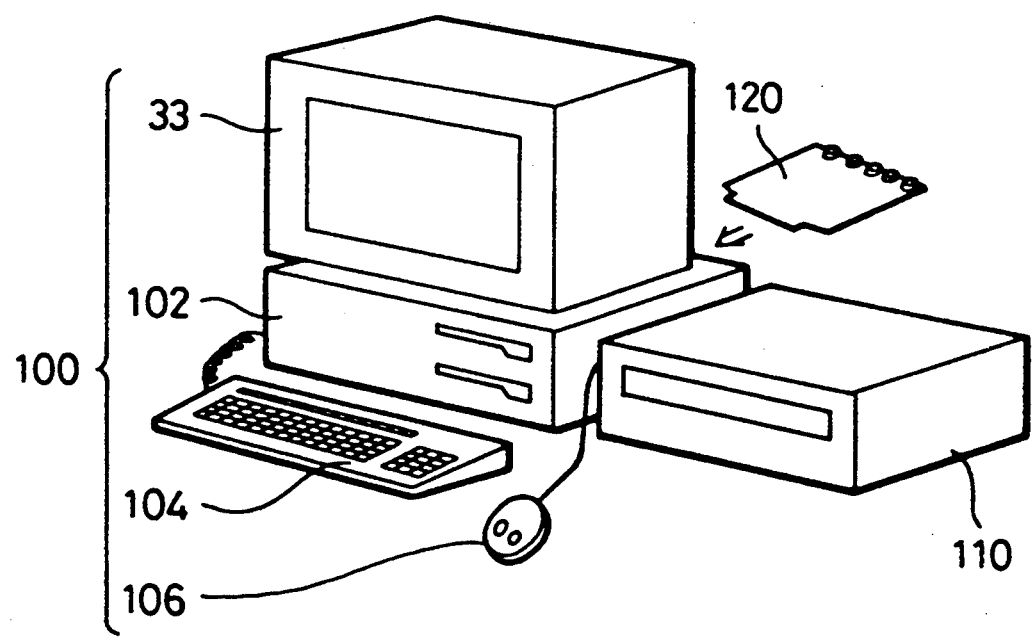
FIG. 1 is a perspective view illustrating a computer system having a DMA controller according to the present invention.

FIG. 1 is a perspective view of a computer system having a DMA controller according to the present invention. The computer system includes a personal computer 100 and a video player 110. The personal computer 100 consists of a computer main frame 102, a color monitor 33, a keyboard 104, and a mouse 106. A video data transfer unit 120, which is constructed in the form of an extension board, is inserted in an extension slot of the computer main frame 102. The video data transfer unit 120 is connected with a video player 110 via a cable (not shown). The video player 110 outputs video signals, which represents a video image displayed on part of the color monitor 33, to the video data transfer unit 120.

Figure 2:
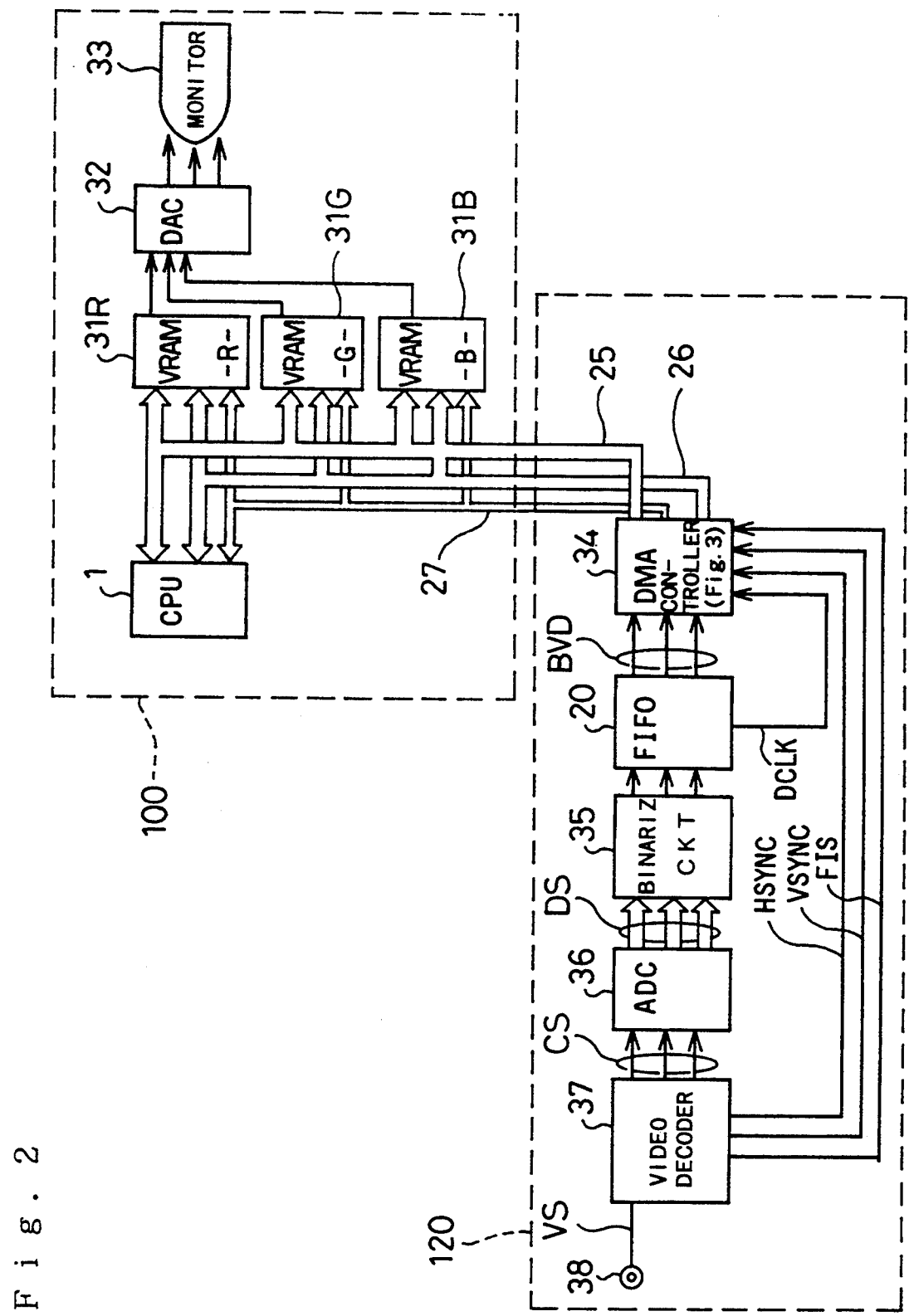
FIG. 2 is a block diagram showing the internal structure of personal computer 100 and video data transfer unit 120.

FIG. 2 is a block diagram showing the internal structure of the personal computer 100 and the video data transfer unit 120. Three VRAMs 31R, 31G, and 31B for the color components R, G, and B, respectively, are address-mapped on a memory map in the personal computer 100. The VRAMS 31R, 31G, and 31B are connected to a CPU 1 via an address bus 25, a data bus 26, and a control bus 27. Video data output from the VRAMs 31R, 31G, and 31B are converted to analog video signals at a D-A converter 32 and transferred to the color monitor 33, and thereby a video image is displayed on the color monitor 33 as a function of the analog video signals.

The video data transfer unit 120 transfers video data to the three VRAMs 31R, 31G, and 31B in the personal computer 100. The video data transfer unit 120 includes a DMA controller 34, an FIFO memory unit 20, a binarization circuit 35, an A-D converter 36, a video decoder 37, and a video signal input terminal 38. In this embodiment, a composite video signal VS is supplied from the video player 110 to the video signal input terminal 38.

The composite video signal VS is decoded by the video decoder 37 to be separated into color signals CS including luminance components of the respective colors R, G, and B, a vertical synchronizing signal /VSYNC, a horizontal synchronizing signal /HSYNC, and a field indication signal FIS. The field indication signal FIS indicates whether the video signal is for an odd field or for an even field in the case of interlace scanning.

The color signals CS are converted from analog to digital by the A-D converter 36, and the digital video data DS are binarized by the binarization circuit 35. The details of the binarization circuit 35 will be described later.

Binary video data BVD obtained by the binarization circuit 35 are stored in the FIFO memory unit 20. The binary video data BVD are output from the FIFO memory unit 20 as serial data, and converted to parallel data in the DMA controller 34 to stand by. The DMA controller 34 then obtains the right of use of the address bus 25, the data bus 26, and the control bus 27 from the CPU 1, and transfers the R, G, and B components of the binary video data BVD to the VRAMs 31R, 31G, and 31B, respectively.

Figure 3:
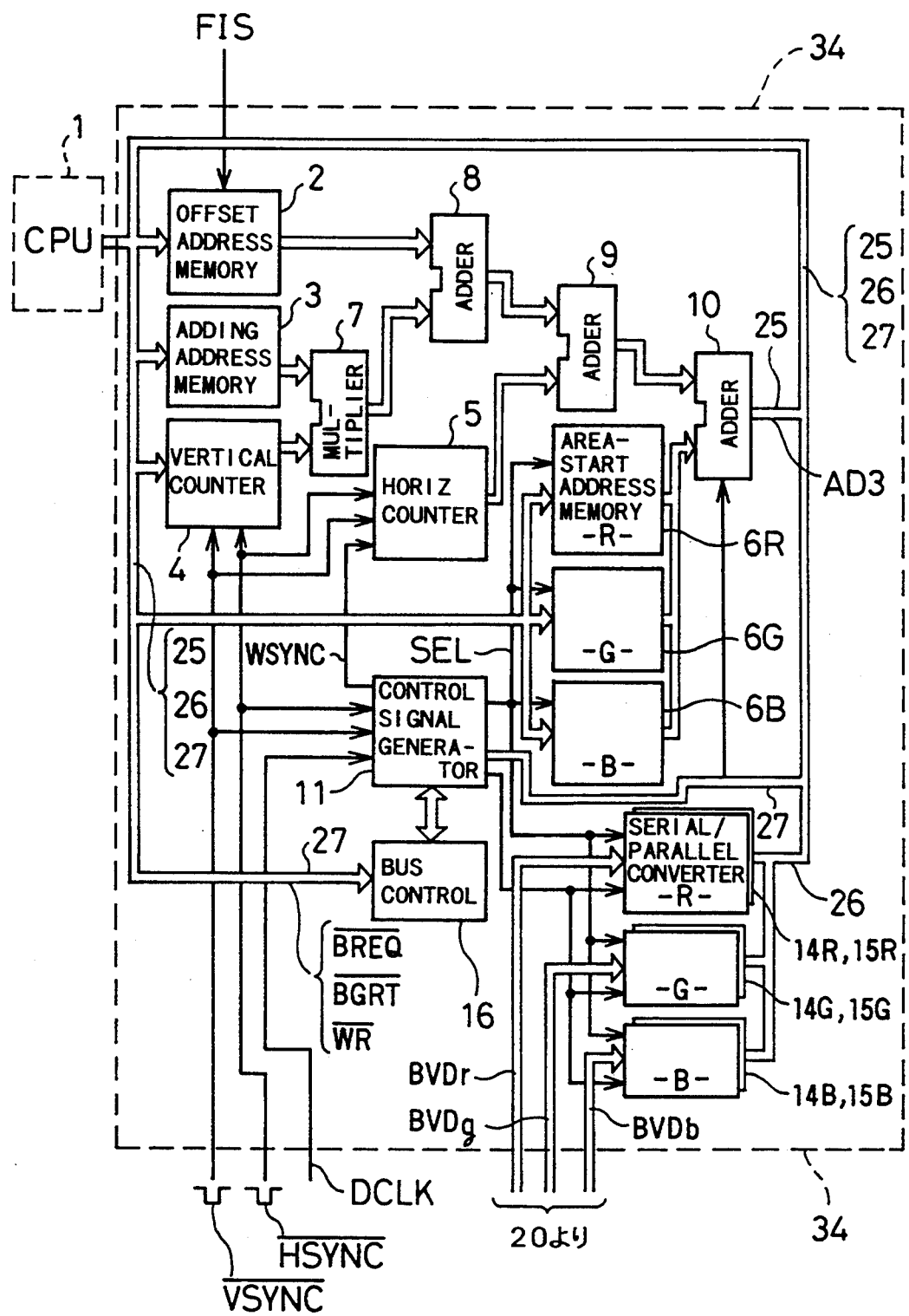
FIG. 3 is a block diagram showing the internal structure of DMA controller 34.

FIG. 3 is a block diagram showing the internal structure of the DMA controller 34. The DMA controller 34 comprises an offset address memory unit 2; an adding address memory unit 3; a vertical counter unit 4; a horizontal counter unit 5; three area-start address memory units 6R, 6G, and 6B; a multiplier 7; and three adders 8, 9, and 10. The multiplier 7 multiplies an adding address stored in the adding address memory unit 3 by a vertical count output from the vertical counter unit 4. The first adder 8 adds the product in the multiplier 7 to an offset address (described later) stored in advance in the offset address memory unit 2. The second adder 9 adds the sum in the first adder 8 to a horizontal count in the horizontal counter unit 5. The third adder 10 adds the sum in the second adder 9 to one of area-start addresses (described later) for the color components R, G, and B stored in the three area-start address memory units 6R, 6G, and 6B, respectively. An output AD3 from the third adder 10 becomes an access address in DMA transfer. Each of the third adder 10 and the three area-start address memory units 6R, 6G, and 6B have a tri-state output.

The DMA controller 34 further comprises a control signal generator 11; two sets of serial-to-parallel converters 14R, 14G, 14B and 15R, 15G, 15B; and a bus control unit 16. Binary video data BVDr, BVDg, and BVDb output in serial order from the FIFO memory unit 20 (FIG. 2) are respectively converted to 8-bit parallel data by the three serial-to-parallel converters 14B, 14G, 14B or 15R, 15G, 15B. Each of the serial-to-parallel converters 14B, 14G, 14B, 15R, 15G, and 15B has a tri-state output.

An output terminal of each serial-to-parallel converter is maintained in the high-impedance state until the 8-bit binary video data obtained by the parallel conversion are transferred to the VRAMs 31R, 31G, and 31B (FIG. 2). While one set of the serial-to-parallel converters output the binary video data BVDr, BVDg, and BVDb onto the data bus 26, the other set executes the serial-to-parallel conversion. The two sets of the serial-to-parallel converters are alternately switched every time when the 8-bit parallel data is obtained for the respective binary video data BVDr, BVDg, and BVDb. Namely, the two sets of serial-to-parallel converters alternately executes serial-parallel conversion and data output.

B. Method of Writing Data into VRAM

Figure 4:
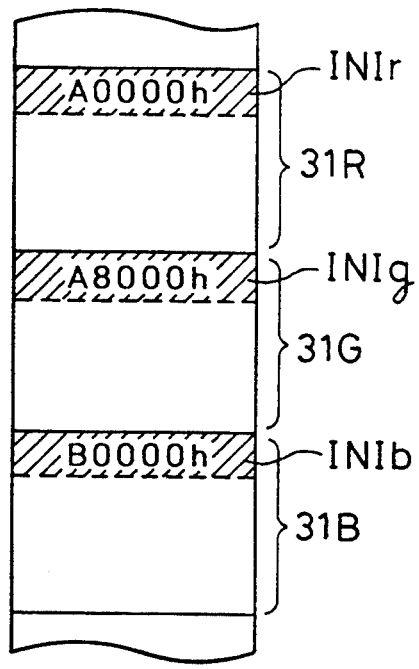
FIG. 4 is a memory map of the three VRAMs 31R, 31G, and 31B.

FIG. 4 is a memory map of the three VRAMs 31R, 31G, and 31B. Memory spaces of the three VRAMs 31R, 31G, and 31B are hereinafter referred to as R plane, G plane, and B place, respectively. An area-start address INIr of the R plane 31R is set at A0000h; an area-start address INIg of the G plane 31G at A8000h; and an area-start address INIb of the B plane 31B at B0000h; where the additional letter "h" denotes hexadecimal notation. Each of the planes 31R, 31G, and 31B occupies an area of 32 kilo-bytes.

Figure 5:
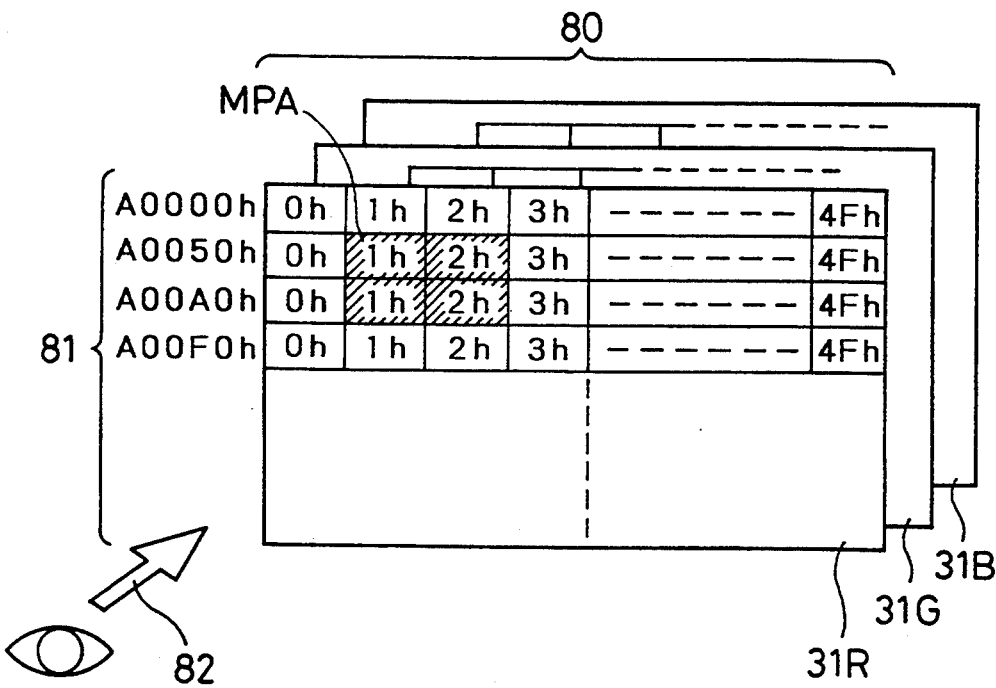
FIG. 5 shows a relationship between each plane 31R, 31G, and 31B and the screen.

FIG. 5 shows a relationship between the planes 31R, 31G, and 31B and the screen. Each of the R plane 31R, the G plane 31G, and the B plane 31B corresponds to a screen which includes a plurality of dots, or pixels, corresponding to 50h bytes in a horizontal range 80, and 199h (=409) scanning lines in a vertical range 81. Since a video image is represented by the binary video data in this embodiment, one dot on the screen corresponds to one bit of video data. Therefore the width (=50h bytes) of the horizontal range 80 on the screen corresponds to a width of 640 pixels. In this embodiment, a moving picture area MPA, shaded in FIG. 5, in which the video data of a moving picture is written through DMA transfer, has a 2-byte horizontal width from the second byte and a 2-line vertical width from the second line in each plane. The moving picture area MPA in the memory space corresponds to an area specified by the operator on the screen of the color monitor 33.

Figure 6:
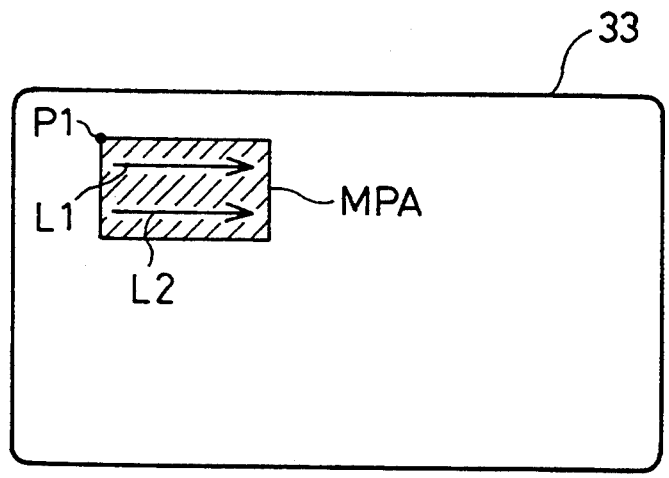
FIG. 6 is a plan view showing a moving picture area MPA within the screen of color monitor 33.

FIG. 6 is a plan view showing the moving picture area MPA specified on the screen of the color monitor 33. The memory space shown in FIG. 5 uniquely corresponds to the display screen of the color monitor 33 shown in FIG. 6. By seeing from a direction 82 indicated in FIG. 5, the moving picture area MPA has a 16-dot horizontal width between the 9th dot from the left and the 24th dot, and a 2-line vertical width on the second and third lines from the top. Explanation will be made first for the case without the interlace scanning for convenience of simplicity. Address operation for the case with the interlace scanning will be described later.

Figure 7:
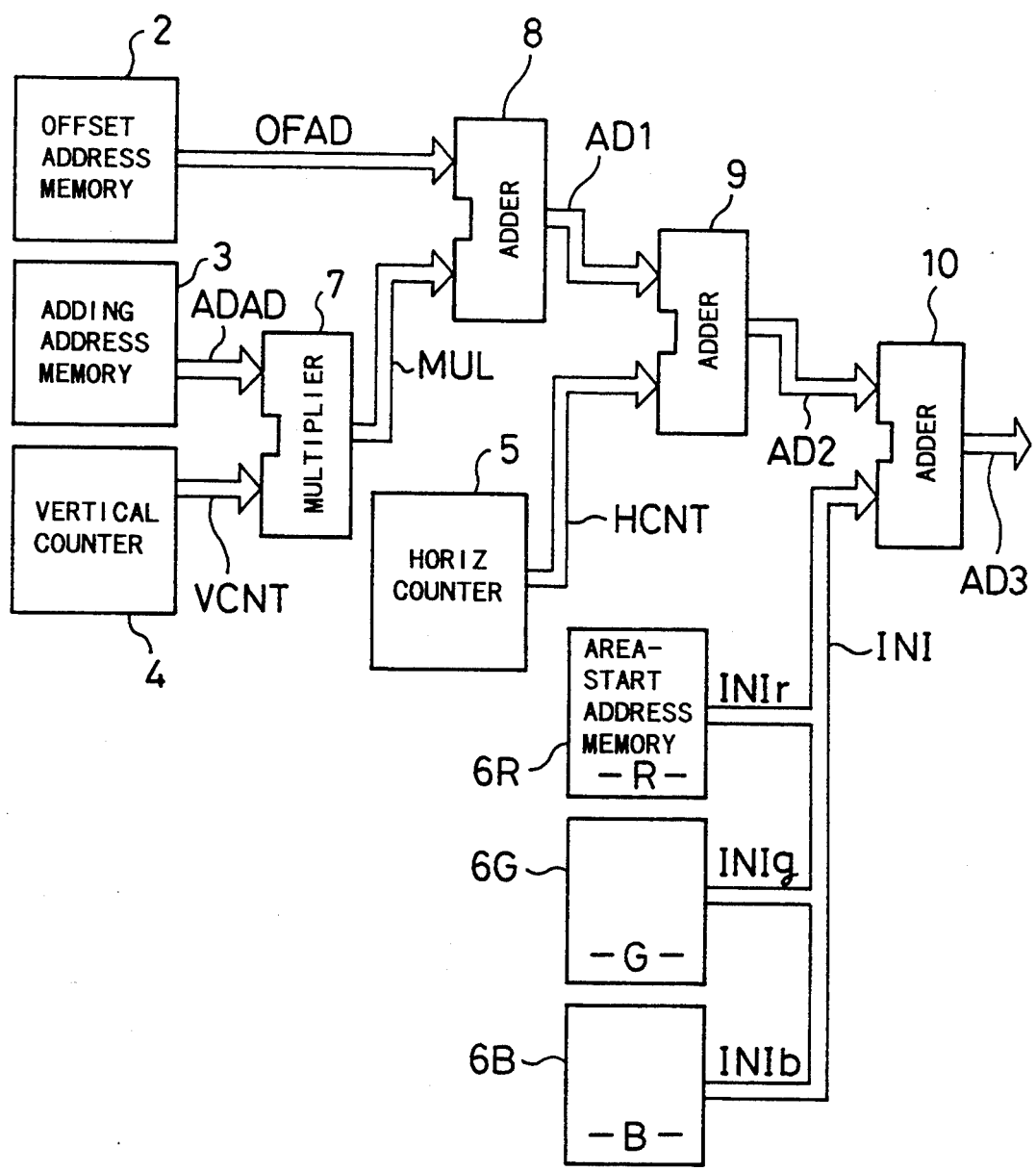
FIG. 7 is an enlarged block diagram showing an address operation unit in the DMA controller 34.

FIG. 7 is an enlarged block diagram showing an address operation unit in the DMA controller 34. An offset address OFAD stored in the offset address memory unit 2 represents an offset value between the area-start address INIr and an address (A0051h) at a writing start position of the moving picture area MPA in the R plane 31R shown in FIG. 5, for example, and it is equal to the difference (=51h) between the area-start address INIr and the writing start address. The offset address OFAD is common to all color components.

The writing start address (=A0051h) is determined according to the position of a left upper point P1 of the moving picture area MPA specified on the screen by the operator (FIG. 6). When the operator specifies a moving picture area MPA on the screen, the CPU 1 calculates a writing start address (=A0051h) corresponding to the left upper point P1, computes the difference between the writing start address (=A0051h) and the area-start address INIr (=A0000h) to obtain an offset address OFAD, and writes the offset address OFAD in the offset address memory unit 2. The operator can set a moving picture area MPA of desirable dimensions at a desirable position, and the offset address OFAD is determined accordingly.

An adding address ADAD stored in the adding address memory unit 3 is equal to the number of bytes on one scanning line in each memory plane, and is set at 50h bytes in this embodiment. The area-start addresses INIr, INIg, and INIb of the R, G, and B planes (FIG. 4) are set in the area-start address memory units 6R, 6G, and 6B, respectively.

An output MUL of the multiplier 7 and outputs AD1 through AD3 of the three adders 8 through 10 are respectively given as follows:

$$MUL = ADAD \times VCNT \quad (1)$$

$$AD1 = OFAD + MUL \quad (2)$$

$$AD2 = AD1 + HCNT \quad (3)$$

$$AD3 = AD2 + INI \quad (4)$$

where INI denotes one of the three area-start addresses INIr, INIg, and INIb.

Outputs AD3r, AD3g, and AD3b for the respective color components R, G, and B from the third adder 10 are given as follows from the above equations (1) through (4):

$$AD3r = (ADAD \times VCNT) + OFAD + HCNT + INIr \quad (5R)$$

$$AD3g = (ADAD \times VCNT) + OFAD + HCNT + INIg \quad (5G)$$

$$AD3b = (ADAD \times VCNT) + OFAD + HCNT + INIb \quad (5B)$$

The vertical count VCNT indicates an ordinal number of scanning line in the moving picture area MPA. The horizontal count HCNT indicates a position from the left end point on each scanning line in the unit of dot, and corresponds to the horizontal address in the present invention. The output MUL of the multiplier 7 corresponds to the vertical address in the present invention.

The equations (5R), (5G), and (5B) give addresses AD3r, AD3g, and AD3b of the respective color planes 31R, 31G, and 31B, where the addresses correspond to a position defined by the vertical count VCNT and the horizontal count HCNT. Since ADAD=50h, OFAD=51h, INIr=A0000h, INIg=A8000h, and INIb=B0000h in this embodiment, the equations (5R), (5G), and (5B) are rewritten as follows:

$$AD3r = (50h \times VCNT) + 51h + HCNT + A0000h \quad (6R)$$

$$AD3g = (50h \times VCNT) + 51h + HCNT + A8000h \quad (6G)$$

$$AD3b = (50h \times VCNT) + 51h + HCNT + B0000h \quad (6B)$$

As described later, the vertical count VCNT is increased by one every time when each scanning line is completed in the moving picture area MPA (FIG. 6), and the horizontal count HCNT is increased by one every time when the 8-bit binary video data of the color components R, G, and B are DMA-transferred on each scanning line. As a result, the binary video data BVD representing a video image within the moving picture area MPA are written in the VRAMs 31R, 31G, and 31B according to the addresses given by the equations (6R), (6G), and (6B).

C. Data Transfer Operation

FIG. 8 is a timing chart showing general operation of the DMA controller 34. When the video decoder 37 outputs a vertical synchronizing signal VSYNC indicating initiation of one field to the DMA controller 34, the vertical counter unit 4 and the horizontal counter unit 5 are reset and initialized to zero.

The vertical synchronizing signal /VSYNC is followed by a back porch period. The back porch period is identical with a vertical blanking period and does not include effective video data. In FIG. 8, the cycle of a horizontal synchronizing signal HSYNC is shortened in the back porch period for convenience of illustration. The symbol '/' attached at the front of a signal name denotes a negative logic signal, which is expressed as the line over the signal name in the drawings.

When the video decoder 37 outputs a first horizontal synchronizing signal /HSYNC of an effective video period after completion of the back porch period, the horizontal counter unit 5 is reset to zero for stand-by while the vertical counter unit 4 starts counting-up.

Figure 9:
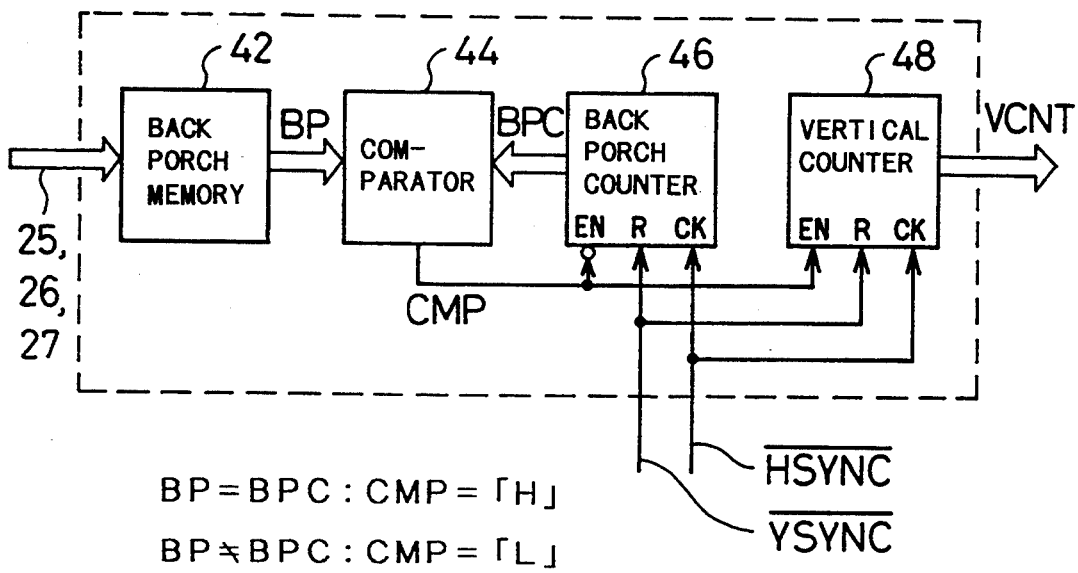
FIG. 9 is a block diagram showing the internal structure of vertical counter unit 4.

FIG. 9 is a block diagram showing the internal structure of the vertical counter unit 4. The vertical counter unit 4 includes a back porch memory 42, a comparator 44, a back porch counter 46, and a vertical counter 48. The back porch memory 42 stores back porch number BP given from the CPU 1 via the buses 25, 26, and 27. The back porch number BP denotes the number of pulses of the horizontal synchronizing signal generated in the back porch period. The horizontal synchronizing signal /HSYNC is supplied to clock input terminals of the back porch counter 46 and the vertical counter 48, respectively, and the vertical synchronizing signal VSYNC is supplied to reset input terminals of the back porch counter 46 and the vertical counter 48, respectively. The comparator 44 compares the back porch number BP stored in the back porch memory with the count BPC in the back porch counter An output CMP of the comparator 44 becomes at level when BP is equal to BPC, and at L level when BP is not equal to BPC. The back porch counter 46 is enabled when the output CMP of the comparator 44 is at L level, whereas the vertical counter 48 is enabled when the output CMP is at H level.

When the vertical counter unit 4 receives the vertical synchronizing signal/VSYNC, the back porch counter 46 and the vertical counter 48 are reset to zero. Since the output CMP of the comparator 44 is at L level at that moment, the back porch counter is enabled to count the number of pulses of the horizontal synchronizing signal /HSYNC, while the vertical counter 48 is not operating. When the back porch counter 46 receives the horizontal synchronizing signals/HSYNC by the number equal to the back porch number BP, that is, when BP becomes equal to BPC. As a result, the output CMP of the comparator 44 becomes at H level, whereby the back porch counter 46 stops counting and the vertical counter 48 starts counting up. During the effective video period, the number of pulses of horizontal synchronizing signal /HSYNC is counted to be the vertical count VCNT.

The control signal generator 11 receives a dot clock signal DCLK, which is used as a synchronizing signal when the FIFO memory unit 20 is buffering video data. The control signal generator 11 executes a variety of control operations described below in synchronism with the dot clock signal DCLK.

The first set of serial-to-parallel converters 14R, 14G, and 14B convert serial binary video data BVD given from the FIFO memory unit 20 to parallel display-array data, and is standing by while holding their outputs high-impedance. Meanwhile, the control signal generator 11 gives an instruction to the bus control unit 16 to output a bus request signal /BREQ to the CPU 1. The CPU 1 subsequently gives a bus grant signal /BGRT to the bus control unit 16 to give the right of use of the buses 25, 26, and 27 to the DMA controller FIG. 10 is a timing chart showing transfer of binary video data in a term T1 shown in FIG. 8. When the bus control unit 16 receives the bus grant signal BGRT from the CPU 1, the control signal generator 11 sends a selection enabling signal SEL to the area-start address memory units 6R, 6G, and 6B as well as the serial-to-parallel converters 14R, 14G, and 14B. The selection enabling signal SEL is a 2-bit signal, where its values '00', '01', and '10' represent R component, G component, and B component, respectively. Namely, one of the three area-start address memory units 6R, 6G, and 6B and one of the serial-to-parallel converters 14R, 14G, and 14B are enabled to output according to the selection enabling signal SEL.

The R component is selected in a term Tr of FIG. 10 because the selection enabling signal SEL has the value '00'. Therefore the address AD3r given by the above equation (6R) is output from the adder 10 onto the address bus 25. At the beginning of the DMA transfer, the equation (6R) gives AD3r=A0051h because VCNT=0h and HCNT=0h. This address corresponds to a writing start position of the moving picture area MPA shown in FIG. 5. Meanwhile, the serial-to-parallel converter 14R outputs the R component BVDr of the binary video data onto the data bus 26. When the control signal generator 11 outputs a writing signal /WR onto the control bus 27, the binary video data BVDr is written in the VRAM 31R for the R plane.

In the next term Tg, the selection enabling signal SEL becomes '01' to select the G component, and the address AD3g given by the equation (6G) is output from the adder 10 onto the address bus 25, accordingly. The address AD3g is equal to A8051h at the beginning of DMA transfer. Meanwhile, the serial-to-parallel converter 14G outputs the G component BVDg of the binary video data onto the data bus 26. When the control signal generator 11 outputs a writing signal /WR onto the control bus 27, the binary video data BVDg is written in the VRAM 31G for the G plane. In the subsequent term Tb, the B component BVDb of binary video data is written in the VRAM 31B for the B plane in the same manner as above.

When one word (8-bit) of each of the binary video data BVDr, BVDg, and BVDb for the respective color components R, G, and B is transferred in the term T1 of FIG. 8, the control signal generator 11 outputs a word synchronizing signal WSYNC to the horizontal counter unit 5. Actually, the control signal generator 11 outputs the word synchronizing signal WSYNC every time when receiving eight clocks of the dot clock signal DCLK from the FIFO memory unit 20. The horizontal counter unit 5 counts up the horizontal count HCNT by one in response to the word synchronizing signal WSYNC. The bus control unit 16 changes the bus request signal /BREQ to H level; returns the right of use of the buses to the CPU 1; and standby.

In the term T1, subsequent 8-bit binary video data BVDr, BVDg, and BVDb are also given from the FIFO memory unit 20 to the second set of serial-to-parallel converters 15R, 15G, and 15B for parallel conversion. The control signal generator 11 supplies the word synchronizing signal WSYNC to the two sets of serial-to-parallel converters other than the horizontal counter unit 5, whereby the two sets of serial-to-parallel converters are alternated in response to the word synchronizing signal WSYNC. Namely, at the end of the term T1, the first set of serial-to-parallel converters 14R, 14G, and 14B starts serial-parallel conversion while the second set of serial-to-parallel converters 15R, 15G, and 15B stand by for data transfer.

In transfer during the next term T2, the equations (6R), (6G), and (6B) give AD3r=A0052h, AD3g=A8052h, and AD3b=B0052h, respectively, because VCNT=0h and HCNT=1h. These addresses AD3r, AD3g, and AD3b correspond to a right upper part of the moving picture element MPA shown in FIG. 5.

The R component BVDr of binary video data is transferred to the VRAM 31R at the addresses A0051h and A0052h shown in FIG. 5 in the terms T1 and T2. The G component BVDg of the binary video data is transferred to the VRAM 31G at the addresses A8051h and A8052h while the B component BVDb is transferred to the VRAM 31B at the addresses B0051h and B0052h. This means that data transfer is completed for a first scanning line L1 in the moving picture area MPA of FIG. 6 in the terms T1 and T2. At the end of the term T2, the video decoder 37 outputs a horizontal synchronizing signal /HSYNC indicating completion of the first scanning line and start of a second scanning line to the DMA controller 34 (see FIG. 8).

The vertical counter unit 4 increases the vertical count VCNT by one to make VCNT=1h in response to the horizontal synchronizing signal /HSYNC indicating the start of a next term T3, whereas the horizontal count HCNT in the horizontal counter unit 5 is reset to zero. The R component BVDr of binary video data is then transferred to the VRAM 31R at the addresses A00A1h and A00A2h shown in FIG. 5 in the same manner as above. The G and B components of the binary video data are also transferred in the same manner.

When data transfer is completed for all the scanning lines L1 and L2 in the moving picture area MPA (see FIG. 6), the vertical synchronizing signal /VSYNC is output from the video decoder 37 to the DMA controller 34, and the vertical counter unit 4 and the horizontal counter unit 5 are reset to zero accordingly. As a result, the DMA controller 34 is initialized to stand by until receiving binary video data of the next field.

As described above, both the vertical count VCNT and the horizontal count HCNT are reset to zero every time when the vertical synchronizing signal /VSYNC is supplied. Every time when the horizontal synchronizing signal/HSYNC is supplied, on the other hand, the vertical count VCNT is increased by one while the horizontal count HCNT is reset to zero. The horizontal count HCNT is increased by one in response to the word synchronizing signal WSYNC every time when one word (8-bit) of each of the binary video data BVDr, BVDg, and BVDb for the respective color components R, G, and B are DMA-transferred. Since the addresses for the VRAMs 31R, 31G, and 31B are calculated on the basis of the vertical count VCNT and the horizontal count HCNT according to the equations (6R), (6G), and (6B), the addresses for the VRAMs are successively updated in synchronism with the vertical synchronizing signal /VSYNC, the horizontal synchronizing signal/-HSYNC, and the word synchronizing signal WSYNC. This results in transferring the binary video data BVDr, BVDg, and BVDB representing a video image within the moving picture area MPA to the VRAMs 31R, 31G, and 31B at about every 1/60 second to display a moving picture.

The VRAMs 31R, 31G, and 31B are two port memories, which allow the DMA controller 34 to write data therein irrespective of the timing of reading data therefrom to the D-A converter 32.

D. Address Operation in Interlace Scanning

FIG. 11 shows memory spaces of an odd line field and an even line filed in interlace scanning. Although FIG. 11 corresponds to FIG. 5, only the R plane is shown for convenience of illustration. The odd line field includes only two addresses A00A1h and A00A2h out of four addresses in the moving picture area MPA while the even line field has the other two addresses A0051h and A0052h.

In interlace scanning, an offset address OFAD1=A1h for the odd line field and an offset address OFAD2=51h for the even line field are registered in the offset address memory unit 2 (see FIG. 3). The offset address memory unit 2 selectively outputs one of the two offset addresses OFAD1 and OFAD2 according to the field indication signal FIS supplied from the video decoder 37. In two-to-one interlacing, the adding address ADAD is twice (=A0h) the value (=50h) for non-interlacing. The offset address OFAD and the adding address ADAD are thus adjusted in interlace scanning, and the addresses of video data are given by the equations (5R), (5G), and (5B) in the same manner as the non-interlace scanning described above.

In transferring video data produced for interlacing, video data for the odd line field and those for the even line field may be written in the same address without performing the interlacing on purpose. In such a case, the offset address OFAD and the adding address ADAD for non-interlacing can be used for both the fields.

In the above embodiment, video data is DMA-transferred to display a moving picture on the monitor 33 in the computer system having an inexpensive CPU without using a special processor. Since the DMA controller 34 effectively displays a moving picture on the monitor 33 without applying an undesirable load onto the CPU, it is not required to re-design the hardware related to the video processing in CPU equipment. In other words, a moving picture corresponding to video data can be displayed simply by inserting a circuit board or card including the DMA controller 34 into the extension slot of an ordinary computer.

Since the address operation unit of the DMA controller 34 (see FIG. 7) consists of one multiplier and a plurality of adders, it can obtain addresses at a high speed. The system does not require video memories other than VRAMs 31R, 31G, and 31B of the personal computer 100 for DMA transfer, the video data transfer unit 120 (see FIG. 2) has a relatively simple circuit structure and is manufactured at a relatively low cost.

E. Details of Binarization circuit 35 and FIFO Unit

Figure 12:
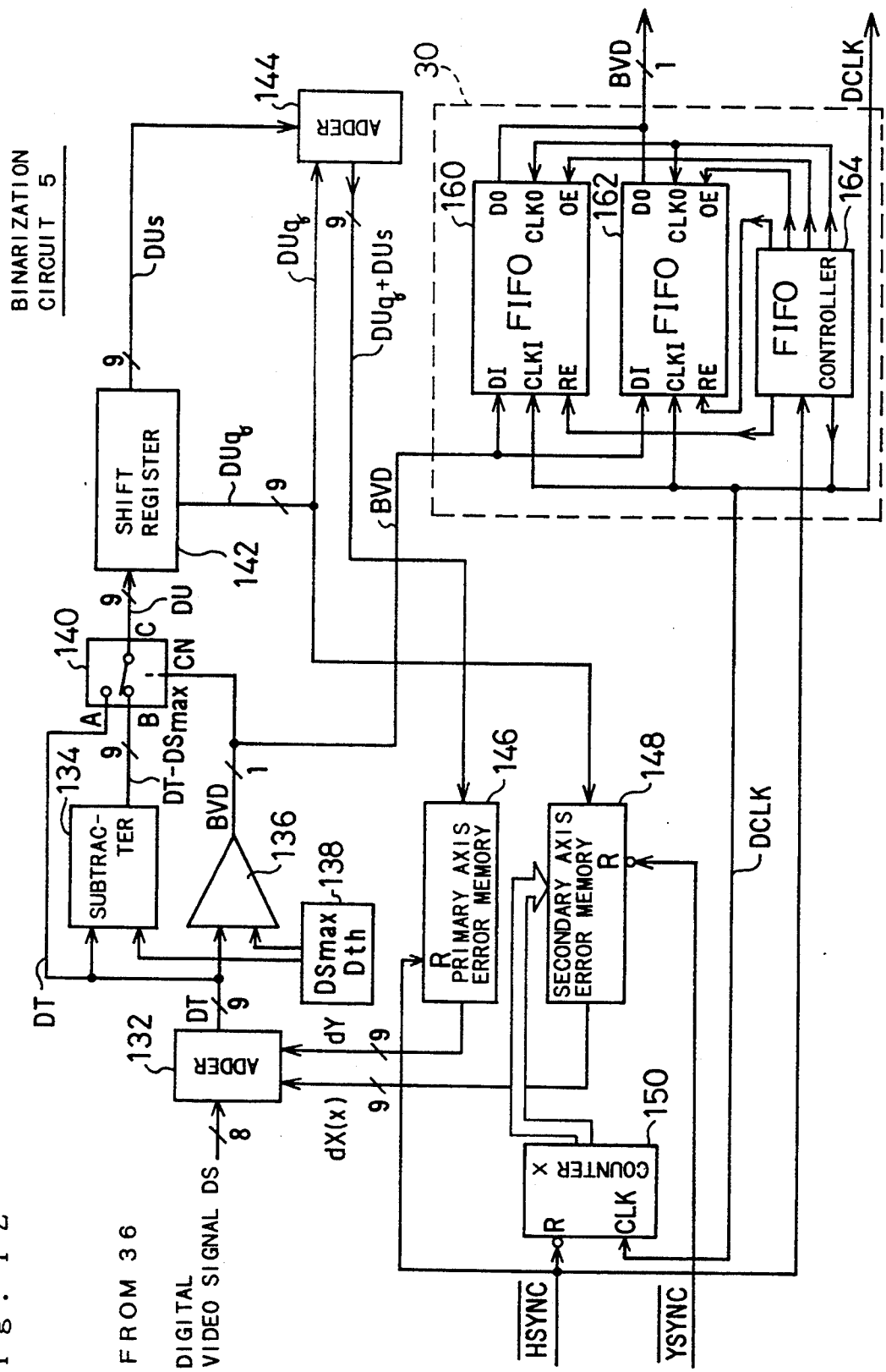
FIG. 12 is a block diagram showing the internal structure of binarization circuit 35.

FIG. 12 is a block diagram showing the internal structure of the binarization circuit 35 and the FIFO memory unit 20. Binarizing method in the binarization circuit 35 is improved from a so-called Error Diffusion Method, which allows high-speed generation of binary video data having a natural tone expression by dividing errors caused in binarizing process into a primary axis (in the vertical direction on the screen) and a secondary axis (in the horizontal direction on the screen).

The binarization circuit 35 comprises a first adder 132, a subtracter 134, a comparator 136, a parameter memory 138, a selector 140, a shift register 142, a second adder 144, a primary axis error memory 146, a secondary axis error memory 148, and a counter 150. The binarization circuit 35 is implemented as a simple gate array including approximately 4,000 gates. The FIFO memory unit 20 includes two FIFO memories 160 and 162 and an FIFO controller 164.

Figure 13:
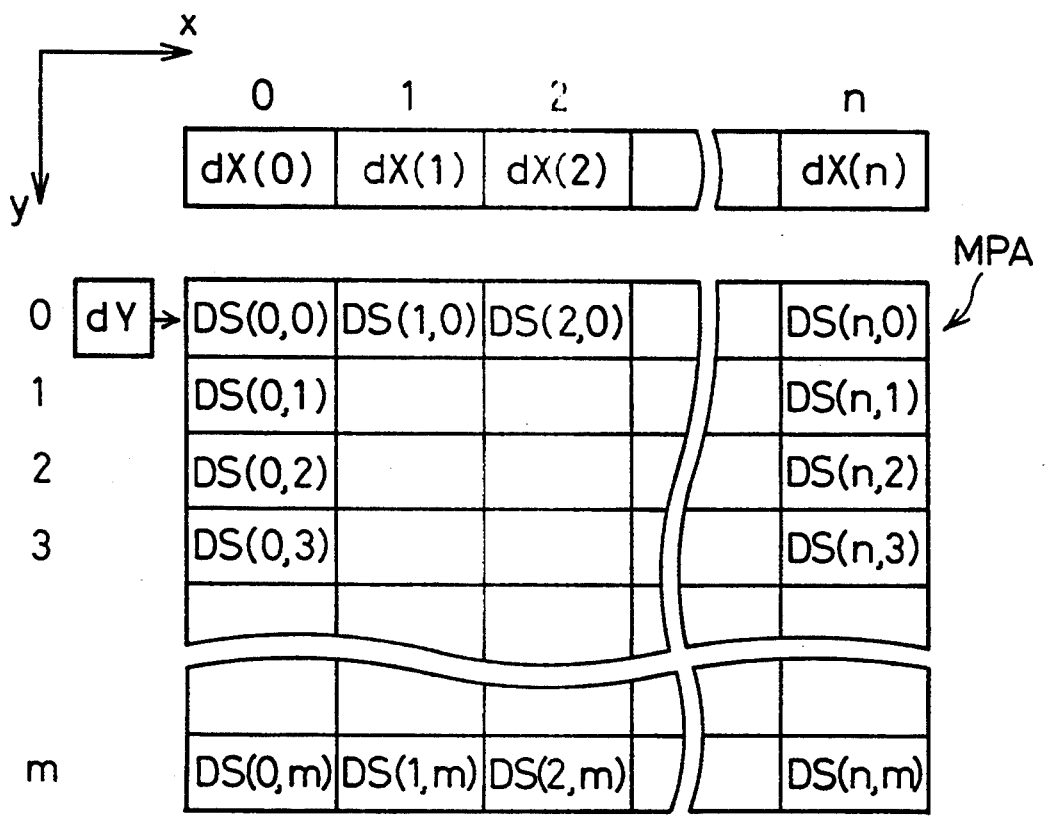
FIG. 13 is a plan view showing an array of multi-digit video signals DS against a secondary axis error dX(x) and a primary axis error dY.

FIG. 13 is a plan view showing an arrangement of multi-digital video signals DS against a secondary axis error dX(x) and a primary axis error dY. The digital video signal DS has a two-dimensional arrangement in the moving picture area MPA. The maximum coordinate value n along the secondary axis x, or the horizontal axis in the moving picture area MPA, is the quantization number for the moving picture area MPA, and so is the maximum coordinate value m along the primary axis y, or the vertical axis. In the above embodiment, $n=(2\times 8-1)=15$ and $m=1$. The secondary axis errors dX(x) are assigned to respective coordinates x along the horizontal axis while one value of the primary axis error dY is assigned to the scanning line under processing.

Figure 14:
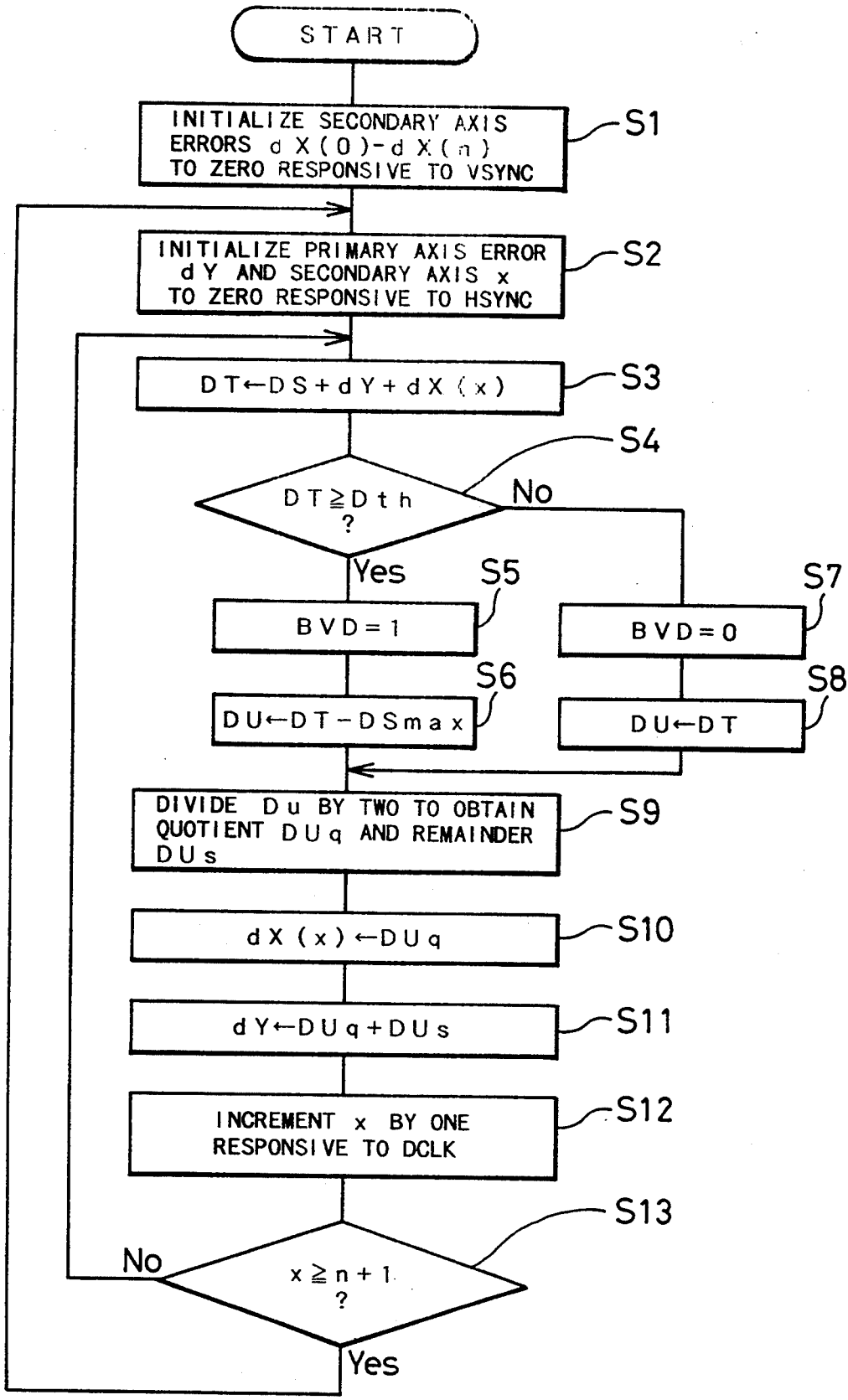
FIG. 14 is a flowchart showing operation of the binarization circuit 35.

FIG. 14 is a flowchart showing the operation of the binarization circuit 35. When the vertical synchronizing signal /VSYNC is supplied from the video decoder 37, the secondary axis errors dX(0) through dX(n) in the secondary axis error memory 148 are initialized to zero (step S1). When the horizontal synchronizing signal /HSYNC is subsequently supplied from the video decoder 37, the primary axis error dY in the primary axis error memory 146 is initialized to zero, and the counter 150 is reset (step S2). The count in the counter 150 indicates the secondary coordinate value x. The FIFO controller 164 supplies the dot clock signal DQLK to the counter 150, which then counts up the secondary coordinate value x in response to the dot clock signal DCLK, and the steps S3 through S13 are executed accordingly. The dot clock signal DCLK is also supplied to the two FIFO memories 160 and 162, and the video data binarized at each secondary coordinate x is stored in either of the two FIFO memories 160 and 162.

At step S2, the FIFO controller 164 alternates the operation modes of the two FIFO memories 160 and 162 in response to the horizontal synchronizing signal /HSYNC such that one FIFO memory is write-enabled and read-inhibited and the other FIFO memory is read-enabled and write-inhibited. Since the horizontal synchronizing signal /HSYNC indicates completion of one scanning line and start of a next scanning line, the alternation of the operation modes of the two FIFO memories 160 and 162 makes it possible that one FIFO memory is storing the binary video data BVD for one scanning line while the other FIFO memory is outputting the binary image data BVD.

At step S3, the first adder 132 adds the primary axis error dY, the secondary axis error dx(x), and the multi-digital video signal DS to generate corrected video data DT. The corrected video data DT consists of a sign bit showing plus or minus, and an absolute value part. DT is equal to DS immediately after the vertical synchronizing signal VSYNC and the horizontal synchronizing signal /HSYNC are given because both the primary axis error dY and the secondary axis error dX are initialized to zero. The corrected video data DT is supplied to the subtracter 134 and the comparator 136. The subtracter 134 outputs a value (DT−DSmax) obtained by subtracting an effective maximum value DSmax of the multi-digital video signal DS from the corrected video data DT. The comparator 136 compares the corrected video data DT with a threshold value Dth (step S4). The maximum value DSmax and the threshold value Dth are stored in advance in the parameter memory 138. The threshold value Dth can be any value within a range between (minimum value+1) and (maximum value−1) in the gradation of the multi-digital video signal DS.

The value of the binary video data BVD output from the comparator 136 becomes one when DT is no less than Dth (step S5), and it becomes zero when DT is less than Dth (step S7).

The binary video data BVD is also supplied to the selector 140, which selects one of the corrected video data DT and the output (DT−DSmax) of the subtracter 134 according to the binary video data BVD. The selector 140 selects the output (DT−DSmax) as an output DU with a sign bit when BVD is equal to one (step S6), and the selector 140 selects the corrected video data DT as the output DU with a sign bit when BVD is equal to zero (step S8).

At step S9, the shift register 142 shifts the absolute value part of the output DU from the selector 140 by one bit to the right and adds the sign bit to the post-shift value. This right shift is equivalent to an operation of dividing the output DU by two. The shift register 142 outputs a quotient DUq with a sign bit and a remainder DUs. The remainder DUs is constituted by the sign bit and the least significant bit of the data DU before shift.

The quotient DUq is stored as the secondary axis error dX(x) in the secondary axis error memory 148 (step S10) while a sum (DUq+DUs) of the quotient DUq and the remainder DUs is stored as the primary axis error dY in the primary axis error memory 146 (step S11). Since the secondary axis error dX(x) is allocated to a specific secondary coordinate x, it is used for the same secondary coordinate x on the next scanning line. On the other hand, since the primary axis error dY has only one value, it is used for the binarizing process at the next coordinate (x+1).

At step S12, the secondary coordinate x in the counter 150 is increased by one in response to the dot clock signal DCLK supplied from the FIFO controller 164. The binary video data BVD is written in one of the FIFO memories 160 and 162 while it is read out of the other to be given to the DMA controller 34.

When the secondary coordinate x is not greater than the maximum value n, the program returns to step S3 to repeat the processing of steps S3 through S13. Namely, the multi-digital video signals DS (0,0) through DS (n,0) shown in FIG. 13 are successively binarized at respective values of the secondary coordinate x=0 through n.

When x becomes equal to n+1, the horizontal synchronizing signal /HSYNC is supplied from the video decoder 37, and the processing from step S2 is restarted. Since the horizontal synchronizing signal /HSYNC indicates completion of one scanning line and start of a next scanning line as mentioned above, the multi-digital signals DS(0,1) through DS(n,1) on the next scanning line are subject to the processing then. The operation modes of the two FIFO memories 160 and 162 are alternated in response to the horizontal synchronizing signal /HSYNC as described before.

The binarization circuit 35 binarizes all the multi-digital signal DS in the moving picture area MPA through the repeated execution of steps S1 through S13.

The binarization circuit 35 described above divides an error caused by binarizing the digital video signal DS into the primary axis error dY and the secondary axis error dX(x), and corrects the video signal DS by adding the errors dY and dX(x) to the video signal DS in the binarizing process for the next dot or for the next scanning line. The binary video data BVD is generated accordingly which can comparatively accurately reproduce the gradation of an original video image. The overall processing can be executed at a high-speed because the error caused by binarization is simply divided into the primary axis error dY and the secondary axis error dX(x).

F. Modifications (1) The present invention is applicable to processing of other types of video signals other than RGB color signals, such as YUV signals used in NTSC system.

(2) The present invention is also applicable to DMA transfer of multi-digital video data without binarizing digital video signals DS. In such a case, the binarization circuit 35 in FIG. 2 is omitted, and the serial-to-parallel converters 14R, 14G, 14B, 15R, 15G, and 15B in FIG. 3 are replaced by three-state buffers. The three cycles Tr, Tg, and Tb in FIG. 10 can be shortened to one cycle by arranging the VRAMs 31R, 31G, and 31B shown in FIG. 4 on one plane and using a memory map in which the three color components R, G, and B are expressed by one word.

(3) Use of a three-port memory for the VRAMs 31R, 31G, and 31B, and data-transfer from the DMA controller 34 via a local bus negate the necessity of obtaining the right of use of buses from the CPU 1, thus realizing higher-speed data transfer and further improving the moving picture quality. Signals shown in FIGS. 10(g), 10(h), and 10(i) represent only examples and may be modified in any desirable form.

(4) The present invention is applicable to a process of restoring compressed digital video data and writing the restored data into the VRAMs. In such a case, the video decoder 37 and the A-D converter 36 are replaced by an image restoration unit.

(5) The circuit of calculating the address AD3 according to the equations (5R), (5G), and (5B) can have another structure. For example, the adder in the DMA controller 34 can be replaced by a subtracter, or alternatively the sequence of addition can be changed to obtain the same results.

The multiplier 7 shown in FIG. 3 can be replaced by an adder and an up-counter, and in such a case the adding address ADAD stored in the adding address memory 3 is added up by the number of times indicated by the vertical count VCNT in the vertical counter unit 4.

Figure 15:
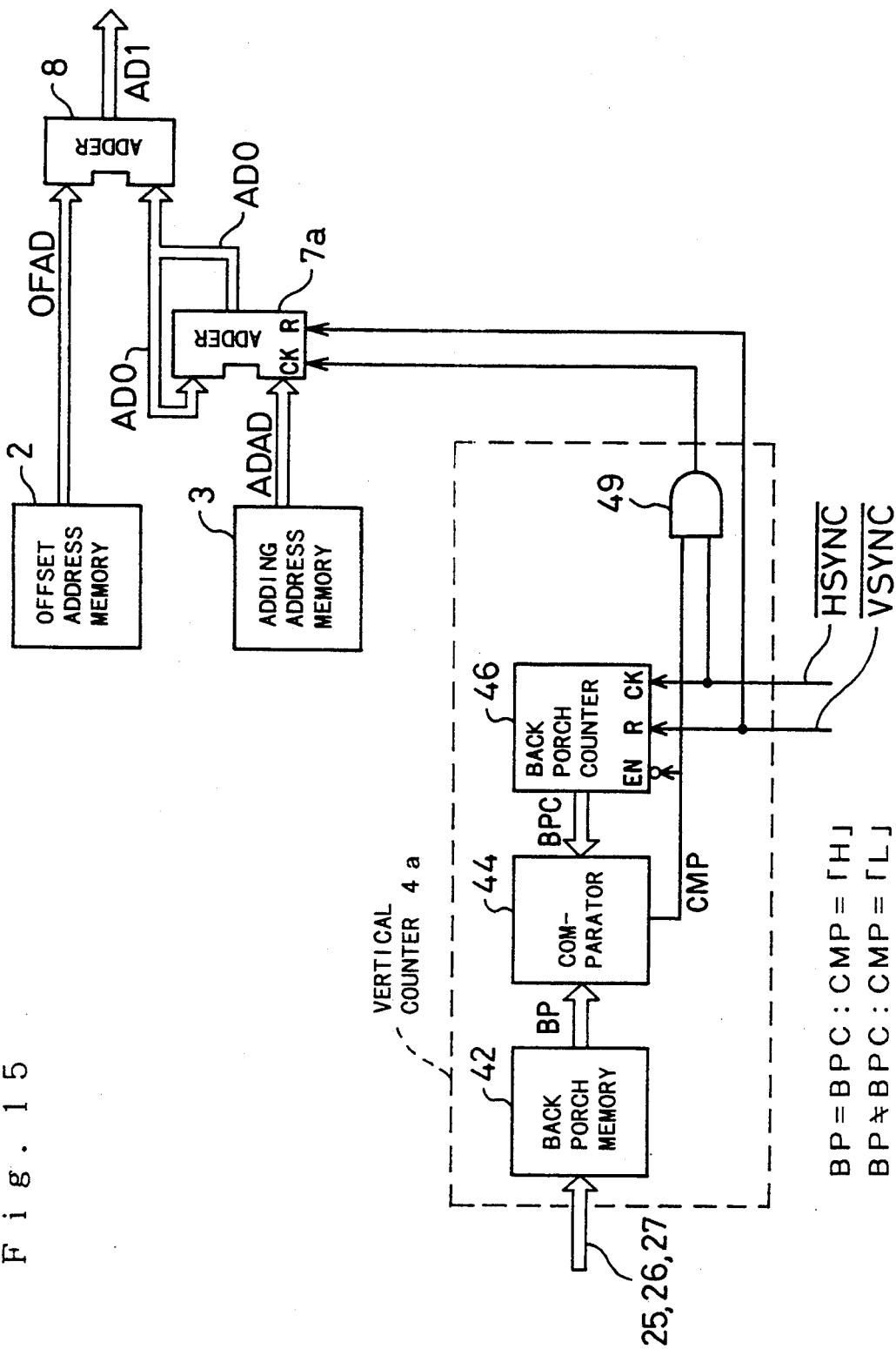
FIG. 15 is a block diagram showing another circuit structure including an adder 7a in place of multiplier 7.
Figure 16:
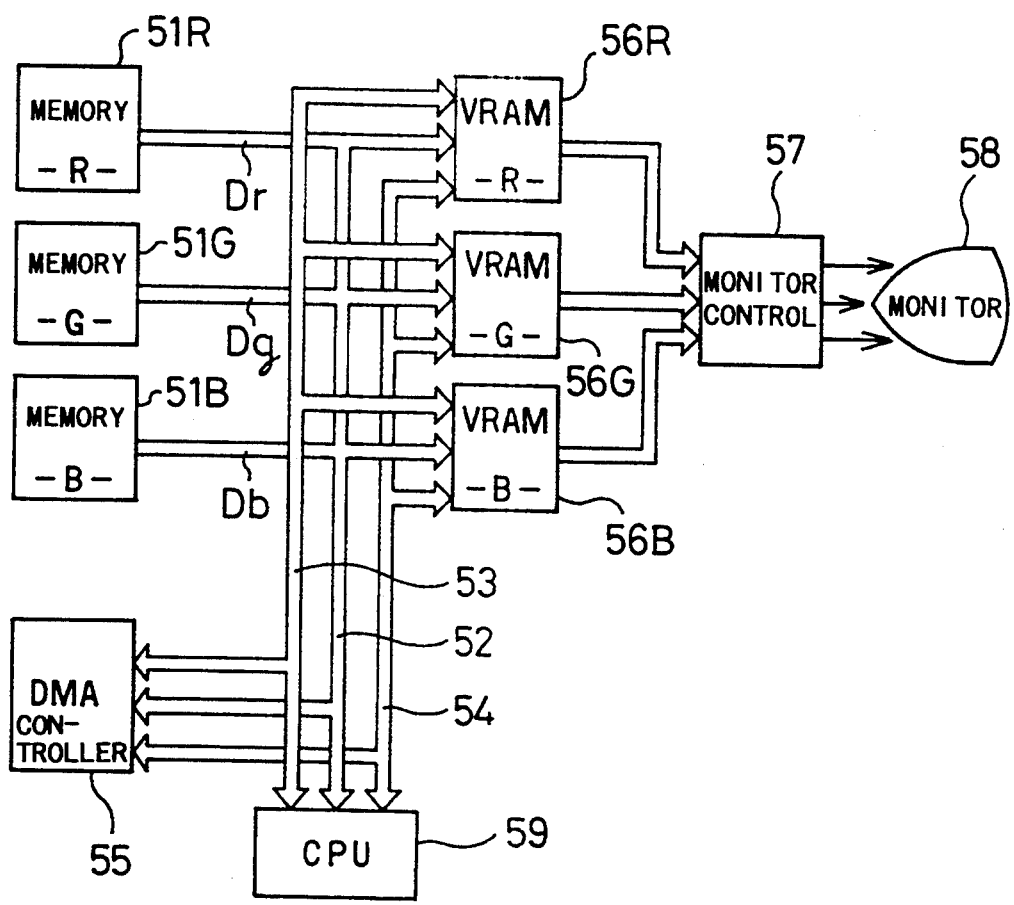
FIG. 16 is a block diagram showing a computer system having a prior art DMA controller.

As shown in FIG. 15, the multiplier 7 can replaced by an adder 7a, whose first input receives the adding address ADAD and whose second input receiving an output AD0 of the adder 7a itself. A vertical counter unit 4a in FIG. 15 has the same structure as the vertical counter unit 4 shown in FIG. 9 other than an AND circuit 49 in place of the vertical counter 48. The AND circuit 49 receives the output CMP from the comparator 44 and the horizontal synchronizing signal /HSYNC. The AND circuit 49 outputs the horizontal synchronizing signal/HSYNC in the effective video period after the back porch period. The horizontal synchronizing signal /HSYNC output from the AND circuit 49 is supplied to a clock input terminal of the adder 7a. The adder 7a also receives the vertical synchronizing signal/VSYNC at a reset input terminal thereof. The output AD0 of the adder 7a therefore shows the same value as the output MUL of the multiplier 7 shown in FIG. 3. Replacement of the multiplier 7 by the adder 7a further simplifies the circuit structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus, for use in a computer system having a processor for performing a logical operation and a video memory controlled by said processor for storing video data, and for transferring moving-picture video data representing a moving picture to a desirable memory area in said video memory, comprising:

a first memory for storing an offset address indicating a start position of said desirable memory area in said video memory;

a second memory for storing an adding address indicating a number of bytes of one scanning line in said video memory;

first operation means for calculating a vertical address as a function of vertical and horizontal synchronizing signals synchronous with said moving-picture video data, said vertical address being equal to a value of said adding address multiplied by a scanning line number indicating an ordinal number of a scanning line in said moving picture, said scanning line number being specified by a number of pulses of said horizontal synchronizing signal given to said first operation means;

a horizontal counter for generating a horizontal address indicating a difference of an address between an initial position of each scanning line in said moving picture and each pixel on said each scanning line;

second operation means for adding said vertical address, said horizontal address, and said offset address to obtain a transfer address indicating an address in said video memory corresponding to a position of said each pixel on said each scanning line in said moving picture, and outputting said transfer address onto an address bus connected to said video memory; and data output means for outputting said moving picture video data to be transferred to said video memory according to said transfer address, onto a data bus connected with said video memory.

2. An apparatus for transferring moving-picture video data in accordance with claim 1, wherein said first operation means comprises:

scanning line number generating means for generating said scanning line number on the basis of the number of pulses of said horizontal synchronizing signal; and a multiplier for multiplying said adding address and said scanning line number to obtain said vertical address.

3. An apparatus for transferring moving-picture video data in accordance with claim 1, wherein said first operation means comprises:

an adder for obtaining said vertical address by adding the adding address to itself a number of times equal to the number of pulses of said horizontal synchronizing signals given.

4. An apparatus for transferring moving-picture video data in accordance with claim 1, wherein said second operation means further comprises:

a third memory for storing first through third start addresses respectively indicating start positions of first through third memory areas in said video memory for storing video data of respective three primary colors; and adding means for adding said offset address, said vertical address, and said horizontal address to each of said first through third start addresses, to thereby obtain first through third transfer addresses for said three primary colors, respectively.

5. An apparatus for transferring moving-picture video data in accordance with claim 4, wherein said adding means comprises:

a first adder for adding said offset address to said vertical address to thereby obtain a first address;

a second adder for adding said horizontal address to said first address to thereby obtain a second address; and a third adder for adding said second address to each of said first through third start addresses to thereby obtain said first through third transfer addresses.

6. An apparatus for transferring moving-picture video data in accordance with claim 1, further comprising:

bus control means for obtaining right of use of said address bus and said data bus from said processor and returning said right of use to said processor.

7. An apparatus for transferring moving-picture video data in accordance with claim 6, wherein said data output means comprises means for converting said moving-picture video data supplied in the form of serial data into parallel data.

8. An apparatus in accordance with claim 1, wherein the computer system further comprises:

a processor for performing logical operation;

a video memory controlled by said processor for storing video data; and display means for displaying a video image as a function of said video data stored in said video memory.

9. A computer system in accordance with claim 8, wherein said apparatus for transferring moving-picture video data comprises:

bus control means for obtaining right of use of said address bus and said data bus from said processor and returning said right of use to said processor.

10. A computer system in accordance with claim 9, wherein said data output means comprises means for converting said moving-picture video data supplied in the form of serial data into parallel data.

11. A computer system in accordance with claim 8, further comprising:

decoder means for decoding a moving-picture video signal given from an external device to thereby produce multi-valued video data, said vertical synchronizing signal, and said horizontal synchronizing signal; and binarizing means for binarizing said multi-valued video data to thereby produce said moving-picture video data.

12. A method, for use in a computer system having a processor for performing a logical operation and a video memory controlled by said processor for storing video data, and for transferring moving-picture video data representing a moving picture to a desirable memory area in said video memory, comprising the steps of:

(a) storing an offset address in a first memory, said offset address indicating a start position of said desirable memory area in said video memory;

(b) storing an adding address in a second memory, said adding address indicating a number of bytes of one scanning line in said video memory;

(c) calculating a vertical address as a function of vertical and horizontal synchronizing signals synchronous with said moving-picture video data, said vertical address being equal to a value of said adding address multiplied by a scanning line number indicating an ordinal number of a scanning line in said moving picture, said scanning line number being specified by the number of pulses of said horizontal synchronizing signals given;

(d) generating a horizontal address indicating difference of an address between an initial position of each scanning line in said moving picture and each pixel on said each scanning line;

(e) adding said vertical address, said horizontal address, and said offset address to obtain a transfer address indicating an address in said video memory corresponding to a position of said each pixel on said each scanning line in said moving picture, and outputting said transfer address onto an address bus connected to said video memory; and (f) outputting said moving-picture video data to be transferred to said video memory according to said transfer address, onto a data bus connected with said video memory.

13. A method for transferring moving-picture video data in accordance with claim 12, wherein said step (c) comprises the steps of:

(c-1) generating said scanning line number on the basis of the number of pulses of said horizontal synchronizing signal; and (c-2) multiplying said adding address and said scanning line number to obtain said vertical address.

14. A method for transferring moving-picture video data in accordance with claim 12, wherein said step (c) comprises the step of:

(c-3) summing said adding address to itself a number of times equal to the number of pulses of said horizontal synchronizing signal given, to obtain said vertical address.

15. A method for transferring moving-picture video data in accordance with claim 12, wherein said step (e) comprises the step of:

(e-1) storing first through third start addresses in a third memory, said first through third start addresses respectively indicating start positions of first through third memory areas in said video memory for storing video data of respective three primary colors; and (e-2) adding said offset address, said vertical address, and said horizontal address to each of said first through third start addresses, to thereby obtain first through third transfer addresses for said three primary colors, respectively.

16. A method for transferring moving-picture video data in accordance with claim 15, wherein said step (e-1) comprises the step of:

(1) adding said offset address to said vertical address to thereby obtain a first address;

(2) adding said horizontal address to said first address to thereby obtain a second address; and (3) adding said second address to each of said first through third start addresses to thereby obtain said first through third transfer addresses.

* * * * *